United States Patent [19]

Degen et al.

[11] Patent Number: 5,290,446
[45] Date of Patent: Mar. 1, 1994

[54] HELICAL WRAPPED FILTER ELEMENT

[75] Inventors: Peter J. Degen, Huntington; Colin F. Harwood, Glen Cove; Clemens C. von Reitzenstein, Baldwin; Stephen A. Geibel, Cortland; Raymond T. Friel, East Meadow, all of N.Y.

[73] Assignee: Pall Corporation, East Hills, N.Y.

[21] Appl. No.: 896,171

[22] Filed: Jun. 10, 1992

[51] Int. Cl.$^5$ .............................................. B01D 27/06
[52] U.S. Cl. ................................ 210/489; 210/497.1; 210/497.2; 55/486; 55/487
[58] Field of Search .......... 210/488, 489, 496, 497.01, 210/497.1, 497.2; 55/486, 487

[56] References Cited

U.S. PATENT DOCUMENTS

| | | |
|---|---|---|
| 3,261,473 | 7/1966 | Riede . |
| 3,268,442 | 8/1966 | Pall et al. . |
| 3,450,632 | 6/1969 | Olson et al. . |
| 3,578,175 | 5/1971 | Majikian . |
| 3,769,128 | 10/1973 | Majikian . |
| 3,804,259 | 4/1974 | Riggleman et al. . |
| 3,933,557 | 1/1976 | Pall . |
| 4,092,246 | 5/1978 | Kummer . |
| 4,101,423 | 7/1978 | Merrill et al. . |
| 4,112,159 | 9/1978 | Pall . |
| 4,235,723 | 11/1980 | Bartlett, Jr. ...................... 210/497.1 |
| 4,421,646 | 12/1983 | Correge et al. . |
| 4,475,973 | 10/1984 | Tanaka et al. ..................... 210/497.1 |
| 4,660,779 | 4/1987 | Nemesi et al. . |
| 4,692,196 | 9/1987 | Ellegood et al. . |
| 4,877,527 | 10/1989 | Brownell . |
| 4,882,056 | 11/1989 | Degen et al. . |
| 4,902,427 | 2/1990 | Szczepanik . |
| 5,028,465 | 7/1991 | Kinsley, Jr. . |
| 5,039,413 | 8/1991 | Harwood .......................... 210/497.1 |
| 5,108,604 | 4/1992 | Robbins ............................ 210/497.1 |
| 5,122,270 | 6/1992 | Ruger et al. ...................... 210/497.1 |
| 5,185,190 | 2/1993 | Grimes ............................. 210/493.5 |

FOREIGN PATENT DOCUMENTS

| | | |
|---|---|---|
| 0095297 | 11/1983 | European Pat. Off. . |
| 55-034143 | 3/1980 | Japan . |
| 855068 | 11/1960 | United Kingdom . |
| 1543404 | 4/1979 | United Kingdom . |

*Primary Examiner*—Robert A. Dawson
*Assistant Examiner*—W. L. Walker
*Attorney, Agent, or Firm*—Leydig, Voit & Mayer, Ltd.

[57] ABSTRACT

An element for treating a fluid flowing through the element which comprises at least two filter medium layers helically wrapped around a pervious, hollow tube, with the filter medium layers forming an overall graded pore structure for the fluid treatment element and/or at least one diffusion layer positioned between the filter medium layers.

30 Claims, No Drawings

HELICAL WRAPPED FILTER ELEMENT

TECHNICAL FIELD OF THE INVENTION

The present invention relates to a fluid treatment element. More particularly, the present invention relates to a fluid treatment element which contains multiple layers of helically wrapped filter media, with the filter media forming an overall graded pore structure for the fluid treatment element or with at least one diffusion layer utilized in conjunction with a filter medium layer, preferably interposed between adjacent filter medium layers.

BACKGROUND OF THE INVENTION

A typical fluid treatment element, for many uses, comprises a hollow, generally cylindrical, filter element with appropriate end caps to direct a fluid, e.g., a gas or liquid, through the filter medium of the filter element. The precise nature of the filter medium will vary with the specific treatment to be given the fluid, and, to that end, the filter element may include a demineralizer or sorbent for separating ionic or chemical components in addition to the filter medium for removing particulates.

The fluid to be treated is generally forced to flow inwardly from the exterior to the interior of such a fluid treatment element, although there is no requirement that such be the case. It should be noted that irrespective of the normal flow of fluid through the fluid treatment element, it is not unusual to have the fluid flow reversed, either accidentally (e.g., due to a surge in fluid pressure downstream from the filter element) or intentionally (e.g., to flush an accumulated cake of particulate matter from the surface of the filter element).

While tubular fluid treatment elements typically have a uniform pore structure, one such fluid treatment element, the Profile ® filter element (Pall Corporation), utilizes a filter medium of a graded or tapered porosity whereby the pore size of the filter medium decreases in the direction of fluid flow. The filter medium of the Profile ® filter element comprises a continuous series of fibers of varying diameter which are layered upon themselves to form a filter medium of a graded pore structure with a constant void volume. Such a medium is disclosed in U.S. Pat. Nos. 4,594,202 and 4,726,901.

A variety of other fluid treatment element configurations have been proposed and utilized over the years, including string wound filter elements, sintered stainless steel powder filter elements, multiple layer filter elements, spiral wrapped fluid treatment elements, and helical wrapped filter elements. Despite these various configurations, there remains a need for a tubular fluid treatment element characterized by a relatively high strength, low pressure drop, high dirt capacity, and long life, and which is nonetheless economical to manufacture and utilize.

It is an object of the present invention to provide such a fluid treatment element. These and other objects and advantages of the present invention, as well as additional inventive features, will be apparent from the description of the invention provided herein.

BRIEF SUMMARY OF THE INVENTION

The present invention involves an element for treating a fluid flowing through the element. The fluid treatment element comprises multiple layers of a filter medium helically wrapped around a pervious, hollow tube. The pore ratings of the multiple filter medium layers are varied such that the fluid treatment element has a graded pore structure. Alternatively, or in addition thereto, at least one diffusion layer is utilized with a helically wrapped filter medium, preferably positioned between at least two filter medium layers.

DETAILED DESCRIPTION OF THE PREFERRED EMBODIMENTS

The fluid treatment element of the present invention is generally of a cylindrical configuration, wherein multiple layers of a filter medium are helically wrapped around a pervious, hollow, cylindrical tube. The filter medium layers are of differing pore ratings so as to provide the fluid treatment element with a graded pore structure; otherwise, or additionally, at least one diffusion layer is interposed between two filter medium layers.

While the present inventive fluid treatment element is preferably a long tube with a cylindrical cross-section, the fluid treatment element may be of other suitable configurations. For example, the fluid treatment element may be a long tube with a square, elliptical, or oval cross-section.

Any suitable filter medium available in sheet form may be used in the context of the present invention. Preferred filter media include high dirt capacity microfibrous filter media and membranes. The filter medium can be prepared from any suitable organic material, such as nylon, aramid, fluoropolymer, polypropylene, polyethylene, polyester, polystyrene, and polyurethane resin, or from inorganic materials such as glass, carbon, stainless steel, and aluminum. Combinations of various filter media may be used in the present inventive fluid treatment element. For example, for the purpose of treating potable water, the present inventive fluid treatment element may include an inner microporous membrane, a series of polypropylene high dirt capacity microfibrous filter medium sheets, a carbon fiber layer, and an outer polypropylene filter medium sheet to prevent any shedding of the carbon fiber layer into the fluid being treated.

A preferred filter medium for use in the context of the present invention is a filter medium prepared from a glass material, such as fiberglass. Such a filter medium is resistent to chemical attack from most materials that may be passed through the fluid treatment element and is suitable for many high temperature applications. The most preferred filter medium for use with the present invention is a high dirt capacity filter media, particularly of polypropylene, which is relatively inexpensive and resistent to chemical attack from many materials that may pass through the fluid treatment element. The preferred high dirt capacity filter medium comprises a fibrous mass of nonwoven microfibers, such as that available from Pall Corporation under the trademark HDC ®. The microfibers of the HDC ® medium are substantially free of fiber-to-fiber bonding and are secured to each other by mechanical entanglement. While the HDC ® medium is a high dirt capacity medium, the medium lacks sufficient strength to readily resist the forces exerted on the medium in the direction of fluid flow or any significant pressure drop between the inside and the outside of the medium because the fibers are not bonded to one another. It has been found that the helical wrapping configuration of the present inventive fluid treatment element overcomes this disadvantage of filter medium sheets such as the HDC ® medium and imparts high strength to the overall fluid treatment element.

The porosity of the filter medium sheets may be of any desired value. Some or all of the filter medium sheets preferably have differing pore ratings and are selected and arranged so as to form a fluid treatment element with an overall tapered or graded pore structure. In particular, the filter media preferably have generally decreasing pore ratings in the direction of fluid flow through said fluid treatment element, which will typically be in the direction of the outside to the inside of the fluid treatment element. For example, the innermost layer or several layers may have a pore rating of 10 $\mu$m, with the next layers or groups of layers having pore ratings of 15, 20, 30, 40, and 50 $\mu$m. A graded porosity generally provides for an increased dirt capacity of the fluid treatment element, while helping to minimize the pressure drop across the finest porosity portion of the fluid treatment element. Generally, the finer the desired overall pore rating of the fluid treatment element, the more of a cascading effect that is needed throughout the fluid treatment element to maintain an appropriate dirt capacity and pressure drop for the fluid treatment element.

The use of one or more diffusion layers with a helically wrapped filter medium layer, preferably between two or more adjacent filter medium layers, also has the effect of increasing the dirt capacity of, while minimizing the pressure drop across, the fluid treatment element. Such a diffusion layer may be employed in the present inventive fluid treatment element in place of the use of filter medium layers of differing pore ratings to achieve a graded pore structure. Preferably, however, diffusion layers are used in conjunction with filter medium layers forming a graded pore structure.

The diffusion layer may be of any suitable material and configuration which allow for, and preferably assist in, the lateral or edgewise flow of the treatment fluid within the fluid treatment element between the innermost filter medium layer and the tube and/or between adjacent filter medium layers. Such a lateral flow assists in minimizing the pressure drop across the fluid treatment element. When the diffusion layer is positioned between the tube and the innermost filter medium layer, the diffusion layer facilitates the passage of fluid through the pervious tube, which will typically be of a perforated or fenestrated construction with a multitude of holes, and the innermost filter medium layer by maximizing the use of the filter medium surface area through which fluid can flow with equal ease beyond those portions of the filter medium in close proximity to the holes of the tube through which fluid will flow. When the diffusion layer is positioned between adjacent filter medium layers, the diffusion layer similarly maximizes the use of the filter medium surface area for filtration. The diffusion layer also acts as a reservoir for accommodating particulate matter, which provides for a relatively high dirt capacity for the fluid treatment element. The diffusion layer is porous so as not to interfere with the fluid flow, and so as not to substantially contribute to the pressure drop, across the filtration element.

A desirable diffusion layer will generally be of a wire mesh, such as of stainless steel, particularly in high temperature environments, or will be prepared from coarse fibers, preferably of the same material used in the filter medium, such as of polypropylene, and be of a high loft. The diffusion layer will typically have a high voids volume. The diffusion layer preferably has a Frazier number of at least two times, and preferably at least four times, the Frazier number of the filter medium sheets. The diffusion layer is preferably of a sheet configuration as is the case with the filter media and may be secured to the filter media. The diffusion layer may be of any appropriate thickness, e.g., about 4-5 mils thick to about 10-15 mils thick or greater.

When the filter medium is a microfibrous filter medium, the diffusion layer is most preferably a porous substrate onto which is secured the nonwoven web of fibers comprising the filter medium. In particular, the combined filter medium and diffusion layer preferably comprises a nonwoven web of polypropylene fibers which have been melt-blown, layered, and secured onto a porous polypropylene substrate which allows for lateral fluid flow.

The use of such a strong substrate is highly beneficial in a number of respects. A strong substrate ensures that the filter medium will be held tightly in place so as to resist deformation during filtration and particularly during reverse flows, such as in backflushing operations. Moreover, a strong substrate also allows for the control of the back-tension placed on each layer as it is wound onto the fluid treatment element so as to control the stiffness or rigidity of the fluid treatment element and to ensure a tight overlap of layers. Precise control of the back-tension at the time the medium is wound onto the element makes it possible to precisely control the rigidity of the element. Surprisingly, winding the layers tightly does not affect either the removal efficiency or the dirt capacity of the fluid treatment element. It is thought that the removal efficiency is controlled by the filter medium, while the dirt capacity is controlled by the existence of the graded pore structure and/or diffusion layer.

Suitable diffusion layers include metal meshes and spun-bonded polypropylene nonwoven sheet materials, although a large number of other coarse, fibered, nonwoven materials could be also used. The most preferred diffusion layer is a spun-bonded polypropylene nonwoven sheet material in 20 g/m$^2$ and 40 g/m$^2$ weights. While heavier diffusion layers, such as 60 g/m$^2$ weight spun-bonded polypropylene nonwoven sheet material, may be used, such diffusion layers may pose handling problems in their use in connection with the present invention.

The hollow tube or core may be of any suitable material which is pervious to the treatment fluid, e.g., which does not significantly affect the pressure drop across the filtration element. Generally, the tube will be prepared from a nonporous material which is perforated or fenestrated with a series of holes to allow fluid to readily flow through the tube. The tube primarily provides internal support for the fluid treatment element and should be strong enough to resist the forces acting on the tube. The tube should be selected so as to provide adequate support during filtration, as well as possible backflushing of the fluid treatment element.

The tube configuration and material should be selected so as to withstand the filtration conditions and to ensure that there is no adverse interaction with the treatment fluid, filter media, and diffusion layer. For example, in high temperature applications, the tube is preferably of a perforated or fenestrated metal construction, e.g., aluminum or stainless steel, while, in low temperature applications, the tube is preferably prepared from a plastic material, e.g., polypropylene.

The tube may be of any suitable diameter which will usually be determined by the necessary diameter of the overall fluid treatment element and the thickness of the filter media and diffusion layers determined by the end-use of the fluid treatment element. Generally, the largest possible tube internal diameter is preferred so as to allow the treatment fluid to easily progress down the length of the interior of the fluid treatment element.

The filter media are helically wrapped around the tube. Any number of filter medium layers may be successively helically wrapped around the tube, with a diffusion layer preferably (but not necessarily) interposed between the filter medium layers. At least two filter medium layers, e.g., three, four, six, eight, ten, twenty, thirty, forty, or more filter medium layers, are used in the context of the present invention to form the fluid treatment element. The filter medium sheets are preferably all of the same type of material, but need not necessarily be so.

The filter medium layers may be helically wrapped such that the edges of the filter medium sheets are abutting or overlapping. The overlapping of the filter media is preferred inasmuch as the effective layers of filter media are thereby increased, and fluid flow pathways which bypass the filter media are minimized. The amount of overlapping may vary from 0% to as much as about 95%, preferably about 25-75%, and most preferably about 50%, of the width of the filter medium sheet. An overlap of about 67% will effectively triple the filter medium layers, while an overlap of about 50% will effectively double the filter medium layers of the filtration element.

The diffusion layer may be positioned in any suitable manner. While the diffusion layer need not be helically wrapped, it is preferably helically wrapped in the same manner as the filter medium sheets. When the diffusion layer is secured to the filter medium sheet, as is the case with the most preferred high dirt capacity filter medium, the diffusion layer will, of course, be helically wound together with the filter medium sheet.

When a 67% overlap is employed, care must be taken to ensure that wrinkling of the filter medium and/or diffusion layers does not result due to the variable outer diameter of the helically overlapped layers as one layer is partially placed over the top of itself as well as the preceding layer. Any wrinkling of the layers may contribute to fluid flow pathways which bypass the filter media. If a 50% overlap is utilized, care must still be taken to avoid wrinkling; however, such wrinkling can generally be avoided by using a sufficiently flexible filter medium and diffusion layer to accommodate the small outer diameter changes as successive layers are put into position.

The stretch of a filter medium sheet to accommodate the slightly larger fluid treatment element diameter as a filter medium sheet overlaps itself, will also ensure that there is enough tightness at each of the filter medium sheet seams so as to minimize leakage problems and improve the strength of the fluid treatment element. A tight overlap eliminates the need for resins or glues to adhere the filter medium sheet to itself or seal the filter medium sheet seams. The filter medium sheet should be strong enough to withstand any necessary stretch to effect the desired wrapping and overlap. In particular, as regards the preferred use of a filter medium sheet comprising a nonwoven web of fibers secured to a porous substrate, the substrate is preferably strong enough to permit the stretching necessary to ensure a leak-free interface between successive wraps or layers.

The filter layers, whether helically wrapped to form abutting or overlapping edges, may be bonded or sealed together by any suitable means. Generally, however, there will be no need to seal abutting or overlapping edges, and, preferably, such sealing is not employed in the present inventive fluid treatment element.

While the exterior of the fluid treatment element may be the outermost filter medium, especially preferred is a protective material which wraps around or encases the fluid treatment element for ease of handling and to provide the fluid treatment element additional support and protection, especially during inside-out fluid flow. Such an exterior protective material or outerwrap may be of any suitable construction and material and is preferably a metal mesh, such as of aluminum or stainless steel, although a plastic mesh or nonwoven material, such as of polypropylene, may also be used. The same concerns regarding the tube also generally apply to the exterior protective material. The exterior protective material may be applied in any suitable manner and is preferably helically wrapped in the same manner as the filter medium layers.

In the filtration of fluids in an outside-to-inside direction, it has been generally found that the use of an outerwrap significantly improves the dirt capacity of the fluid treatment element, even though the outerwrap has a pore rating which is much higher than that of the individual filter medium layers and the overall fluid treatment element. In the filtration of fluids in an inside-to-outside direction, the hollow tube or a separate layer positioned between the tube and the innermost filter medium may serve the function of the outerwrap in improving the dirt capacity of the fluid treatment element.

The fluid treatment element of the present invention may also comprise additional layers for support, drainage, or the like. Such additional layers may be positioned in any suitable location, e.g., interposed between filter medium layers and/or diffusion layers or positioned between the tube and the innermost filter medium. Such additional layers may also be applied in any suitable manner, e.g. by helically wrapping such layers in the same manner as the filter medium layers.

The various layers which may be helically wrapped around the tube to form the present inventive fluid treatment element, e.g., the filter medium layers, diffusion layers, exterior protective layer, and other additional layers, may be all wrapped in the same or different, e.g., alternating, directions. The filter medium layers are preferably all wrapped in the same direction, and, to the extent, other layers are helically wrapped, the other layers are preferably wrapped in the same direction as the filter medium layers.

In most uses, the present inventive fluid treatment element will be equipped with end caps for directing the flow of the fluid through the fluid treatment element. In particular, the fluid treatment element will typically utilize an open end cap and a blind end cap which will fit over the ends of the fluid treatment element so as to ensure that the fluid being treated does not bypass the filter medium layers. The fluid treatment element may also use two open end caps to enable the fluid treatment element to be used in series with other fluid treatment elements. The end caps may be of any suitable material and can be secured to the fluid treatment element in any suitable manner. Generally, the end caps will be prepared from the same material as the tube or stainless steel.

The present inventive fluid treatment element may be used in a variety of end uses, including, but not limited to, filter boiler water for electric power plants, the filtration of sugar juices and syrups, the filtration of potable water supplies, the treatment of wastewater, the treatment of gaseous fluids, the recovery of catalyst in fluid catalyst cracking, the filtration of flue gas emissions, and the like. The ability to quality control the filter medium before wrapping gives a unique ability to give sharp, well-defined, and optimized control over the removal efficiency and dirt capacity of the fluid treatment element of the present invention. The present inventive fluid treatment element will usually have an overall effective pore rating or removal efficiency superior to that of the individual filter medium layer with the tightest pore rating used to prepare the fluid treatment element. Since the fluid treatment element of the present invention is highly uniform, the fluid treatment element also allows for a uniform precoat or the like to be applied to its outside surface with a constant thickness so as to assist in preventing premature precoat cake cracking in, for example, power plant boiler water filtration end uses.

The following examples further illustrate the present invention but, of course, should not be construed as in any way limiting its scope.

In these examples, the OSU-F2 test, also known as the beta rating system, was used to evaluate the removal efficiencies of the various fluid treatment elements. The OSU-F2 test referred to herein is ANSI Standard B93-31-1973, which has been modified for use in aqueous filter testing. Specifically, for data in the 0.5 to 25 $\mu m$ range, a standardized silicious contaminant, AC Fine Test Dust, is prepared as a stable suspension in water at a preset concentration, and the suspension is pumped at 5 gpm/sq. ft. through the fluid treatment element. For data in the 25 to 90 $\mu m$ range, a military standard oil with a viscosity of 10 centipoise is used with a standardized silicious contaminant, AC Coarse Test Dust, and the suspension is pumped at 10 gpm/sq. ft. through the fluid treatment element. The test system is equipped with an upstream and a downstream particle counter to count the amount of contaminant of particular diameters upstream and downstream of the filter medium, and these counts are used to determine the removal efficiencies with respect to particular contaminant diameters. Simultaneously with the removal efficiency measurements, the pressure drop across the fluid treatment element is measured. The quantity of incident standard contaminant required to develop a pressure of 40 psi across the fluid treatment element is reported herein as the dirt capacity of the fluid treatment element.

EXAMPLE 1

A fluid treatment element in accordance with the present invention was prepared using a cylindrical tube and six sheets of 2 inch wide HDC ® filter medium, i.e., a melt-blown polypropylene filter medium with a nonwoven web of polypropylene fibers of various thicknesses secured to an 8-10 mils thick spun-bonded polypropylene nonwoven substrate of a 20 g/m$^2$ weight. The polypropylene substrate functioned as a diffusion layer.

The cylindrical tube was a hollow stainless steel tube of about 0.026 inch thickness with the seam welded along its length. The cylindrical tube had a length of about 4½ feet and an outer diameter of about 0.75 inch. The cylindrical tube was perforated with 3/32 inch holes on 5/32 inch centers.

The first filter medium sheet was helically wrapped around the cylindrical tube such that it overlapped the ends of the cylindrical tube and with a 50% overlap of the width of the filter medium sheet onto itself, with the substrate side of the filter medium against the cylindrical tube so as to avoid fibers from penetrating into the center of the cylindrical tube. Five additional layers of filter medium were then wound onto the cylindrical tube such that they overlapped the ends of the cylindrical tube, each with a 50% overlap and with the substrate layer on the outer side of the cylindrical tube. The resulting fluid treatment element had an overall outer diameter of about 1 inch.

All of the filter media sheets were wrapped along the entire length of the cylindrical tube so that they extended somewhat beyond the end of that tube. A hot wire "knife" was then used to slice through the wrapped layers to cut the fluid treatment element to the 4½ foot length of the cylindrical tube and to heat-seal successive layers together so as to prevent fluid leakage around the filter media.

The characteristics of each of the six successive filter medium layers are set forth below, where, as for all of the examples set forth herein, the weight is of the filter medium itself (i.e., not including the substrate or diffusion layer) and the thickness is of the combination of the filter medium and substrate or diffusion layer, in an uncompressed state prior to wrapping under high back-tension.

| Layer | Approximate 99% Removal Efficiency (OSU-F2 test) | Bubble Point (inches water column) | Weight (g/ft$^2$) | Thickness (mils) | Air Flow Delta Pressure (inches water column at 28 ft/min) |
|---|---|---|---|---|---|
| 1 | 20 $\mu m$ | 7.5–9.5 | 3.0–3.5 | 27 | 0.22 |
| 2 | 20 $\mu m$ | 5.0–6.0 | 2.5–2.8 | 26 | 0.10 |
| 3 | 40 $\mu m$ | 2.6–3.4 | 2.2–2.6 | 25 | 0.07 |
| 4 | 40 $\mu m$ | 2.6–3.4 | 2.2–2.6 | 25 | 0.07 |
| 5 | 90 $\mu m$ | 1.4–2.0 | 1.0–1.3 | 20 | 0.02 |
| 6 | 90 $\mu m$ | 1.4–2.0 | 1.0–1.3 | 20 | 0.02 |

The resultant fluid treatment element was evaluated and determined to have a 99.95% removal efficiency (OSU-F2 test) of 10 microns. The fluid treatment element had a dirt capacity of 17.4 grams per 20 inches of filter length (6.92 cubic inches of filter volume), or about 2.5 grams/cubic inch of filter volume.

EXAMPLE 2

A fluid treatment element was prepared in accordance with the present invention in the same manner as set out in Example 1, except that the characteristics of the filter medium layers were a set forth below.

| Layer | Approximate 99% Removal Efficiency (OSU-F2 test) | Bubble Point (inches water column) | Weight (g/ft²) | Thickness (mils) | Air Flow Delta Pressure (inches water column at 28 ft/min) |
|---|---|---|---|---|---|
| 1 | 10 μm | 25.0–29.0 | 3.7–4.2 | 19 | 1.40 |
| 2 | 15 μm | 15.0–19.0 | 3.9–4.3 | 24 | 0.57 |
| 3 | 17 μm | 11.0–13.0 | 4.2–4.8 | 26 | 0.40 |
| 4 | 20 μm | 7.5–9.5 | 3.0–3.5 | 27 | 0.22 |
| 5 | 30 μm | 5.0–6.0 | 2.5–2.8 | 26 | 0.10 |
| 6 | 40 μm | 2.6–3.4 | 2.2–2.6 | 25 | 0.07 |

The resultant fluid treatment element was evaluated and determined to have a 99.95% removal efficiency (OSU-F2 test) of 5 microns. The fluid treatment element had a dirt capacity of 12.7 grams per 20 inches of filter length (6.92 cubic inches of filter volume), or about 1.8 grams/cubic inch of filter volume.

EXAMPLE 3

A fluid treatment element was prepared in accordance with the present invention in the same manner as set out in Example 1, except that 62 sheets of 3-1/16 inch wide polypropylene HDC® filter medium were helically wrapped onto a 1.3 inch outer diameter, fenestrated, injection molded, hollow polypropylene tube. The final diameter of the fluid treatment element was about 2.5 inches. The characteristics of the filter medium layers are set forth below.

| Layer | Approximate 99% Removal Efficiency (OSU-F2 test) | Bubble Point (inches water column) | Weight (g/ft²) | Thickness Per Layer (mils) | Air Flow Delta Pressure (inches water column at 28 ft/min) |
|---|---|---|---|---|---|
| 1–4 | 20 μm | 6.0–9.5 | 4.8–5.3 | 24–30 | 0.20–0.40 |
| 5–12 | 30 μm | 4.7–6.4 | 1.45–1.75 | 11–16 | 0.08–0.12 |
| 13–22 | 40 μm | 2.7–3.3 | 1.45–1.75 | 14–20 | 0.025–0.055 |
| 23–36 | 70 μm | 1.5–1.9 | 1.45–1.75 | 19–25 | 0.015–0.035 |
| 37–50 | 120 μm | 1.2–1.4 | 4.8–5.0 | 7.5–9.5 | <0.01 |
| 51–62 | 140 μm | 1.0–1.2 | 3.8–4.2 | 9–11 | <0.01 |

The resultant fluid treatment element was evaluated and determined to have a 99.95% removal efficiency (OSU-F2 test) of 11.6 microns. The fluid treatment element also exhibited a dirt capacity of 72.4 grams per 10 inches of filter length (35.82 cubic inches of filter volume), or about 2.0 grams/cubic inch of filter volume.

EXAMPLE 4

Fluid treatment elements were prepared in accordance with the present invention in the same manner as set out in Examples 1 and 2. These fluid treatment elements had a 99.95% removal efficiency (OSU-F2 test) of 5, 10, and 20 microns. The dirt capacities of these fluid treatment elements were compared to the dirt capacities of septa filter elements of the same size, shape, and pore rating. These comparative filters were formed by the direct impingement of fibers onto a rotating core placed in the path of the fibers. The build of the fibers was profiled such that the fiber size and pore size increased as the diameter increased, thereby providing a graded pore structure for the fluid treatment element.

| 99.95% Removal Efficiency (OSU-F2 test) | Comparative Filter Typical Dirt Capacity (grams/10 inch length) | Present Inventive Filter Typical Dirt Capacity (grams/10 inch length) |
|---|---|---|
| 5 | 3 | 6 |
| 10 | 4 | 9 |
| 20 | 6 | 10 |

This comparison data demonstrates the superior dirt capacity of the present inventive fluid treatment element as compared to a comparable fluid treatment element having a graded pore structure.

EXAMPLE 5

A fluid treatment element of the present invention utilizing multiple filter medium and diffusion layers was evaluated in the laboratory as a replacement for a string wound filter and a sintered stainless steel powder filter used in the filtration of boiler water in a nuclear power plant. The string wound filter is inexpensive and has a moderate life expectancy but also is characterized by a high degree of variability in its removal rating. The sintered stainless steel powder filter has a good removal rating but is expensive and has a short life expectancy. In contrast, the present inventive fluid treatment element is inexpensive, has an excellent removal rating, and has a long life which is expected to be about four times as long as the life of the string wound filter and at least twenty times longer than the life of the sintered stainless steel filter. The fluid treatment element of the present invention is also expected to be quite effective in removing undesirable iron oxides and iron hydroxides which are present in boiler water and can sometimes get through string wound filters. Accordingly, the present inventive fluid treatment element possesses the best attributes of both the string wound and sintered stainless steel filters and is superior to either of those filters alone.

EXAMPLE 6

A fluid treatment element in accordance with the present invention was prepared using fiberglass filter media. Since fiberglass filter media which is formed from glass microfiber bonded with a high temperature resin have a very good life expectancy and an exceptional ability to withstand elevated temperatures, such a fluid treatment element is believed to be very suitable as, for example, a high temperature vent filter on chemical reaction vessels.

The fiberglass filter medium sheets were prepared by depositing fiberglass onto a polyester substrate by a vacuum draw-down from an aqueous slurry of fiberglass. The polyester substrate was a 7 mils thick polyester nonwoven substrate which was calendared down to 3 mils thickness. The fluid treatment element was prepared by wrapping multiple layers of 3-1/16 inches wide fiberglass medium onto a 1.3 inch outer diameter, fenestrated, injection molded, hollow polypropylene tube. The wrap was made by abutting the layers against each other, i.e., 50% overlap. A total of 36 layers of fiberglass medium were utilized. Successive layers wrapped onto the cylindrical tube were more and more open, i.e., had increasingly larger pores. The final diameter of the fluid treatment element was about f2.6 inches.

The characteristics of each of the 36 successive filter medium layer are set forth below.

| Layer | Approximate 99% Removal Efficiency (OSU-F2 test) | Bubble Point (inches water column) | Thickness Per Layer (mils) | Number of Layers |
|---|---|---|---|---|
| 1–4 | 12 μm | 20.4 | 20 | 4 |
| 5–6 | 14 μm | 16.4 | 21 | 2 |
| 7–8 | 15 μm | 15.2 | 22 | 2 |
| 9–10 | 17 μm | 12.5 | 26 | 2 |
| 11–12 | 20 μm | 8.5 | 22 | 2 |
| 13–16 | 25 μm | 7.8 | 17 | 4 |
| 17–18 | 45 μm | 4.9 | 19 | 2 |
| 19–20 | 50 μm | 3.1 | 31 | 2 |
| 21–28 | 90 μm | 2.3 | 6 | 8 |
| 29–36 | 100 μm | 1.7 | 4 | 8 |

The resultant fluid treatment element was evaluated and determined to have a 99.95% removal efficiency (OSU-F2 test) of 5 microns. The fluid treatment element had a dirt capacity of 40 grams per 10 inches of filter length (39.8 cubic inches of filter volume), or about grams/cubic inch of filter volume.

EXAMPLE 7

A fluid treatment element in accordance with the present invention was prepared using a single glass fiber filter medium layer and stainless steel diffusion and protective layers. The diffusion layer was positioned between the filter medium and the tube, while the protective layer was positioned over the filter medium. Such a fluid treatment element is expected to be a superior blowback filter element for filtering out particles from gaseous fluids such as air.

The diffusion layer was a stainless steel woven wire mesh formed from 0.0055 inch diameter wire with a 42×42 wires/inch weave. The wire mesh was in the form of a continuous strip, and the edges of the wire mesh were folded and calendered to a 0.010 inch thickness. The finished strip was 1.5 inches wide. The diffusion layer was helically wrapped around a 1.3 inch outside diameter perforated stainless steel cylindrical tube under a tension of about 3 lb/in width. The diffusion layer was wrapped such that the edges of the diffusion layer abutted, i.e., with a 0% overlap.

A glass fiber filter medium of 0.006 inch thickness and having a 99.95% removal efficiency (OSU-F2 test) of 15 microns was helically wrapped onto the cylindrical tube with the diffusion layer in place under a tension of about 0.3 lb/in width. The filter medium was 3 inches wide and was wrapped with a 50% overlap of the edges so as to effectively form two layers of filter medium onto the cylindrical tube. The glass fiber filter medium was prepared by depositing glass fibers on a glass scrim using about 15% polytetrafluoroethylene binder.

Another layer of the stainless steel woven wire mesh of the same type used as the diffusion layer was used as a protective layer and was helically wrapped around the cylindrical tube with the filter medium and diffusion layers in place. The protective layer was wrapped under a tension of about 10 lb/in width. The fluid treatment element was then equipped with a blind open end cap and a blind closed end cap. The fluid treatment element had a filter area of 96 in$^2$.

Three of these fluid treatment elements with a total filter area of 288 in$^2$ were tested in the filtration of air. The clean pressure drop of the elements at 20 fpm was 1.2 inches of water column. The bubble points of the three fluid treatment elements were 4.9, 6.1, and 5.3 inches water column.

The three fluid treatment elements were also tested in a continuous forward flow/venturi blowback mode using the standardized silicious contaminant AC Fine Test Dust in an amount of 1000 g which was suspended in air and passed through the fluid treatment elements in an outside-in direction. The test was started at a flow rate of 25 CFM. The terminal pressure drop to initiate a blowback was set at 1.0 psi, which was increased to 1.5 psi after 13 cycles. A total of 1000 blowback cycles were performed under these conditions. After 1000 cycles, the flow rate was increased to 30 CFM, and an additional 1000 cycles of blowback were performed at the increased flow rate using a terminal pressure drop to initiate blowback of 1.5 psi.

At the fluid flow velocity of 12.5 FPM, the recovery pressure drop was initially 0.5 psi, increased to 0.86 psi after the 13th cycle, increased to 1.05 psi after the 18th cycle, increased to 1.1 psi after the 25th cycle, and remained at 1.1 psi through the 1000th cycle. At the fluid flow velocity of 15.0 FPM, the recovery pressure drop started and remained at 1.15 psi for 1000 cycles. The filtration efficiency was 99.965%.

While this invention has been described with an emphasis upon preferred embodiments, it will be obvious to those of ordinary skill in the art that variations in the preferred fluid treatment element may be prepared and used and that it is intended that the invention may be practiced otherwise than as specifically described herein. Accordingly, this invention includes all modifications encompassed within the spirit and scope of the invention as defined by the following claims.

What is claimed is:

1. An element for treating a fluid flowing through the element, which fluid treatment element comprises at least one filter medium sheet comprising a fibrous mass of nonwoven microfibers capable of removing particulates from a fluid helically wrapped around a pervious, hollow tube to form an overlap of about 0% to about 95% of the width of said filter medium sheet and at least one diffusion layer which allows for lateral flow of said fluid within said fluid treatment element.

2. The fluid treatment element of claim 1, which element comprises at least two filter medium sheets and at least one diffusion layer positioned between at least two successive filter medium sheets.

3. The fluid treatment element of claim 2, wherein said tube has a substantially cylindrical cross-section.

4. The fluid treatment element of claim 3, wherein at least two of said filter medium sheets have different pore ratings.

5. The fluid treatment element of claim 4, wherein said filter medium sheets having different pore ratings are arranged such that said filter medium sheet pore ratings decrease in the normal direction of fluid flow through said fluid treatment element.

6. The fluid treatment element of claim 5, wherein said diffusion layers are helically wrapped around said cylindrical tube.

7. The fluid treatment element of claim 6, wherein said filter medium sheets comprise a fibrous mass of nonwoven fibers secured to said diffusion layers.

8. The fluid treatment element of claim 7, wherein said filter medium sheets and said diffusion layers comprise polypropylene.

9. The fluid treatment element of claim 8, wherein said fluid treatment element comprises at least three filter medium sheets and at least one diffusion layer positioned between at least two successive filter medium sheets.

10. The fluid treatment element of claim 9, wherein said fluid treatment element comprises an innermost filter medium sheet positioned such that said diffusion layer associated therewith is oriented inwardly toward said cylindrical core and at least five additional filter medium sheets positioned such that said diffusion layers associated therewith are oriented outwardly away from said cylindrical core.

11. The fluid treatment element of claim 3, wherein said filter medium sheets are helically wrapped to form abutting edges of said filter medium sheets.

12. The fluid treatment element of claim 3, wherein said filter medium sheets are helically wrapped to form an overlap of about 25% to about 75% of the width of said filter medium sheets.

13. The fluid treatment element of claim 3, wherein said filter medium sheets are helically wrapped to form an overlap of about 67% of the width of said filter medium sheets.

14. The fluid treatment element of claim 3, wherein said filter medium sheets are helically wrapped to form an overlap of about 50% of the width of said filter medium sheets.

15. The fluid treatment element of claim 1, wherein said diffusion layer is helically wrapped around said tube.

16. The fluid treatment element of claim 15, wherein said diffusion layer is helically wrapped to form abutting edges of said diffusion layer.

17. The fluid treatment element of claim 16, wherein said diffusion layer is a mesh.

18. The fluid treatment element of claim 1, wherein a diffusion layer is positioned between the innermost filter medium sheet and said tube.

19. The fluid treatment element of claim 18, which element further comprises a pervious protective layer wrapped around the outermost filter medium sheet.

20. The fluid treatment element of claim 1, which element comprises at least two filter medium sheets.

21. The fluid treatment element of claim 20, wherein at least two of said filter medium sheets have different pore ratings and are arranged such that the pores of the filter medium sheets decrease in the radially outward direction.

22. The fluid treatment element of claim 1, wherein said filter medium sheet comprises a material selected from the group consisting of nylon, aramid, fluoropolymer, polyethylene, polyester, polystyrene, polyurethane, glass, carbon, stainless steel, and aluminum.

23. The fluid treatment element of claim 22, wherein said filter medium sheet comprises fiberglass.

24. The fluid treatment element of claim 1, wherein said filter medium is helically wrapped to form an overlap of about 25% to about 75% of the width of said filter medium sheet.

25. The fluid treatment element of claim 1, wherein said filter medium is helically wrapped to form an overlap of about 67% of the width of said filter medium sheet.

26. The fluid treatment element of claim 1, wherein said filter medium is helically wrapped to form an overlap of about 50% of the width of said filter medium sheet.

27. An element for treating a fluid flowing through the element, which fluid treatment element comprises at least one filter medium sheet comprising a fibrous mass of nonwoven microfibers capable of removing particulates from a fluid helically wrapped around a pervious, hollow tube and at least one diffusion layer which allows for lateral flow of said fluid within said fluid treatment element, wherein said diffusion layer is a spunbonded polypropylene nonwoven sheet material having a weight of between about 20 g/m$^2$ and about 60 g/m$^2$.

28. The fluid treatment element of claim 27, wherein said diffusion layer is a spun-bonded polypropylene nonwoven sheet material having a weight of about 20 g/m$^2$.

29. The fluid treatment element of claim 27, wherein said diffusion layer is a spun-bonded polypropylene nonwoven sheet material having a weight of about 40 g/m$^2$.

30. An element for treating a fluid flowing through the element, which fluid treatment element comprises at least six filter medium sheets helically wrapped around a pervious, hollow, cylindrical tube to form an overlap of 50% of the width of each of said filter medium sheets, wherein each of said filter medium sheets comprises a fibrous mass of nonwoven polypropylene fibers secured to a diffusion layer comprising a porous polypropylene substrate, the innermost of said filter medium sheets is positioned such that said diffusion layer associated therewith is oriented inwardly toward said cylindrical core, the other filter medium sheets are positioned such that said diffusion layers associated therewith are oriented outwardly away from said cylindrical core, and at least three of said filter medium sheets have different pore ratings and are positioned such that said filter medium sheet pore ratings decrease in the normal direction of fluid flow through said fluid treatment element.

* * * * *